US010935023B2

(12) United States Patent
Plantard et al.

(10) Patent No.: US 10,935,023 B2
(45) Date of Patent: Mar. 2, 2021

(54) PUMP FOR LIQUID PRODUCT COMPRISING A SEALING DEVICE AND SPRAYING INSTALLATION COMPRISING SUCH A PUMP

(71) Applicant: EXEL INDUSTRIES, Epernay (FR)

(72) Inventors: Nicolas Plantard, Paris (FR); Boussif Khaldi, Paris (FR)

(73) Assignee: EXEL INDUSTRIES, Epernay (FR)

( * ) Notice: Subject to any disclaimer, the term of this patent is extended or adjusted under 35 U.S.C. 154(b) by 0 days.

(21) Appl. No.: 16/746,855

(22) Filed: Jan. 18, 2020

(65) Prior Publication Data

US 2020/0232456 A1 Jul. 23, 2020

(30) Foreign Application Priority Data

Jan. 23, 2019 (FR) ...................................... 1900588

(51) Int. Cl.
| | |
|---|---|
| *F04B 53/14* | (2006.01) |
| *B05B 11/00* | (2006.01) |
| *F16J 15/00* | (2006.01) |
| *F16K 31/122* | (2006.01) |
| *F04B 53/02* | (2006.01) |
| *F16J 15/56* | (2006.01) |
| *F04B 53/16* | (2006.01) |
| *F16J 15/48* | (2006.01) |

(52) U.S. Cl.
CPC ........ *F04B 53/143* (2013.01); *B05B 11/0008* (2013.01); *F04B 53/02* (2013.01); *F04B 53/164* (2013.01); *F16J 15/004* (2013.01); *F16J 15/48* (2013.01); *F16J 15/56* (2013.01); *F16K 31/1225* (2013.01)

(58) Field of Classification Search
CPC ......... F04B 53/02; F04B 53/164; F16J 15/48; F16J 15/56

USPC ......................................................... 277/522
See application file for complete search history.

(56) References Cited

U.S. PATENT DOCUMENTS

| | | | | |
|---|---|---|---|---|
| 275,299 | A * | 4/1883 | Weale | F16J 15/186 |
| | | | | 277/522 |
| 1,324,775 | A * | 12/1919 | Anathor-Henriksen | ...................... |
| | | | | F16J 15/56 |
| | | | | 384/16 |
| 3,181,473 | A | 5/1965 | Duron | |
| 3,632,235 | A | 1/1972 | Grenci | |
| | | (Continued) | | |

FOREIGN PATENT DOCUMENTS

| | | |
|---|---|---|
| EP | 3203067 A1 | 8/2017 |
| FR | 798995 A | 5/1936 |

OTHER PUBLICATIONS

INPI Rapport de Recherche Preliminaire for Patent Application No. FR 1900588, Sep. 19, 2019, 2 pp.

*Primary Examiner* — Abiy Teka
*Assistant Examiner* — Matthew Wiblin
(74) *Attorney, Agent, or Firm* — Soquel Group LLC (57) ABSTRACT

A pump for a liquid product including a body inwardly delimiting a compression chamber, in which a piston is mounted sliding, as well as an external motor coupled to the piston for movement thereof by a piston rod passing through a wall secured to the pump body, through a passage opening equipped with a sealing device including a stack of seals kept gripped axially against the pump body, the sealing device including an axial compression member inserted between a crown, included in the sealing device, and the wall secured to the pump body.

12 Claims, 6 Drawing Sheets

(56) References Cited

U.S. PATENT DOCUMENTS

| | | | | |
|---|---|---|---|---|
| 3,870,439 | A | * | 3/1975 | Stachowiak ........ F04B 53/1025 417/454 |
| 3,907,307 | A | * | 9/1975 | Maurer ................. F16J 15/183 277/513 |
| 4,178,133 | A | * | 12/1979 | Rawicki ................ F04B 43/107 277/320 |
| 4,500,267 | A | * | 2/1985 | Birdwell ................ F04B 15/02 417/342 |
| 4,611,973 | A | * | 9/1986 | Birdwell ................ F04B 15/02 417/342 |
| 4,716,924 | A | * | 1/1988 | Pacht ..................... F04B 49/10 137/327 |
| 5,129,625 | A | * | 7/1992 | Wood ..................... F16J 15/186 251/214 |
| 5,456,583 | A | * | 10/1995 | Handzel .............. F04B 53/1002 417/454 |
| 2017/0227001 | A1 | * | 8/2017 | Wrobel ................ F04B 53/144 |
| 2017/0292506 | A1 | * | 10/2017 | Shultz ..................... F04B 53/14 |
| 2018/0156212 | A1 | * | 6/2018 | Ballario ................ F04B 53/164 |

* cited by examiner

FIG.6

PUMP FOR LIQUID PRODUCT COMPRISING A SEALING DEVICE AND SPRAYING INSTALLATION COMPRISING SUCH A PUMP

CROSS-REFERENCE TO RELATED APPLICATION

This application claims priority of French Patent Application No. 19 00588, filed on Jan. 23, 2019.

FIELD OF THE INVENTION

The present invention relates to a pump for a liquid product including a body inwardly delimiting a compression chamber, in which a piston is mounted sliding, as well as an external motor coupled to the piston for movement thereof by a piston rod passing through a wall secured to the pump body, through a passage opening equipped with a sealing device including a stack of seals kept gripped axially against the pump body.

BACKGROUND OF THE INVENTION

In the field of pumps for liquid products and more particularly the field of piston pumps, a motor translates a piston rod in a chamber of the pump, so as to slide the piston in an alternating movement inside the chamber. The chamber and the piston thus delimit a variable volume that evolves cyclically between a minimum volume and a maximum volume, paced by the to-and-fro movements of the piston in the chamber. The variation of the volume of the chamber makes it possible to suction, then discharge a liquid product, taken into the variable-volume chamber and discharged outside the pump through an outlet opening. Piston pumps operate cyclically, a cycle generally including a suction phase of the liquid product and a discharge phase of the liquid product. The suction and discharge phases are correlated with the alternating translation movements of the piston in the chamber.

The piston pumps are particularly suitable for high pressures, of up to 500 bars.

Such pumps are, for example, used in the field of projecting or spraying paint, particularly for "airless" spraying. Airless spraying is a spraying method in which a product is sprayed at a high pressure, without adding air, in order to be applied on a target surface.

The engine being located outside the body of the pump, a rod passing through the pump body couples the exterior motor to the piston located in the pump body.

A device formed by a stack of V-seals is used to ensure the sealing between the piston rod and the pump body or a part secured to this body. A stack of V-seals includes several levels of seals, each in the form of a chevron or V, that are suitable for ensuring the sealing in pumps working with alternating movements, as is the case for piston pumps. The stack of V-seals is located at a passage opening through which the piston moves during its alternating translational movement.

A gland packing is necessary to periodically and manually tighten the stack of seals, which are subject to wear over the course of uses of the pump. The used V-seals are no longer compressed enough and therefore do not perform their sealing gasket function, leaks then being able to appear. The seals must then be tightened by compression, in order to allow the stack of seals to perform its function as a sealing device.

Such a sealing device requires regular upkeep, consisting of tightening the V-seals. This operation is time-consuming and requires the intervention of a qualified person, skilled in the field of gland packings and pumps, as well as increased monitoring. Additionally, strongly tightening the V-seals creates a greater need for compressed air when starting up the pump, typically from 1 to 1.5 bars of air versus 0.3 to 0.4 bars normally. Conversely, excessively weak tightening creates product leaks upon startup.

This is the problem that the invention more particularly aims to address, by proposing a new pump for a liquid product that eliminates the maintenance and monitoring step.

SUMMARY OF THE DESCRIPTION

To that end, the invention relates to a pump of the type mentioned above, in which the sealing device includes an axial compression member inserted between a crown, comprised in the sealing device, and the wall secured to the pump body.

Thus, the axial compression member participates in the constant compression of the V-seals, so as to prevent liquid product leaks, without performing regular maintenance steps. The sealing device can thus be considered "self-tightening".

According to advantageous but optional aspects of the invention, such a pump incorporates one or more of the following features, considered in any technically allowable combination:

- The crown delimits, in part, a receiving housing configured for accommodating the axial compression member.
- The crown is translatable relative to the wall between a first position, in which the receiving housing has a minimum volume, and a second position, in which the receiving housing has a volume strictly greater than the minimum volume.
- The minimum volume of the receiving housing is delimited by a bore arranged in the wall and by a bore arranged in the crown, the respective bores facing one another.
- The sealing device comprises a cartridge, arranged coaxially to a movement axis of the piston and around the rod and delimiting an inner volume configured for accommodating the stack of V-seals, and a ring, the stack of V-seals and the ring being arranged coaxially to the movement axis around the rod, the ring being configured for cooperating by shape matching with the seal located at the end of the stack of V-seals, opposite the axial compression member.
- The piston and the chamber form a variable volume as a function of the movement of the rod, configured for accommodating and pressurizing the liquid product, the pressure of the liquid product in the variable volume exerting, on the ring, a force parallel to the movement axis of the piston in the chamber, the ring compressing the stack of V-seals under the effect of the force exerted by the liquid product in a first direction, and the axial compression member participating in the compression of the stack of V-seals by exerting a compression force, parallel to the movement axis of the piston, in a second direction, opposite the first direction.
- A cavity is arranged in the surface of the wall oriented toward the inside of the chamber, one end of the cartridge bears on the bottom of the cavity and the end of the cartridge includes at least one relief for the engagement of the tool.

The resilient return member is a flat compression spring.

The crown comprises a wear indicator of the V-seals of the stack, passing through the wall and visible from the outside of the pump.

According to one aspect of the invention independent from those mentioned above, in particular the structure of the sealing device, the piston and the rod belong to equipment moving in an alternating movement along the movement axis of the piston, while this equipment comprises three parts assembled together reversibly, namely the piston, the rod and a securing endpiece with an extension rod of the exterior motor. In this case, it is possible to provide that the rod is symmetrical relative to a plane passing through its center and perpendicular to the movement axis of the piston, such that it can be mounted in two positions head to tail in the pump. Furthermore, the rod advantageously includes two tapped or threaded end parts in or around which the piston, on the one hand, and the end piece, on the other hand, are screwed.

According to another aspect, the invention relates to an installation for spraying a liquid product, in particular an airless spraying installation, which comprises a pump as mentioned above, a sprayer and a pipe fluidly coupling the pump to the sprayer in order to transfer the liquid product from the pump to the sprayer.

BRIEF DESCRIPTION OF THE DRAWINGS

The invention will be better understood, and other advantages thereof will appear more clearly, in light of the following description of one embodiment of the invention according to its principle, provided solely as an example and done in reference to the appended drawings, in which.

DETAILED DESCRIPTION

Figure 1:
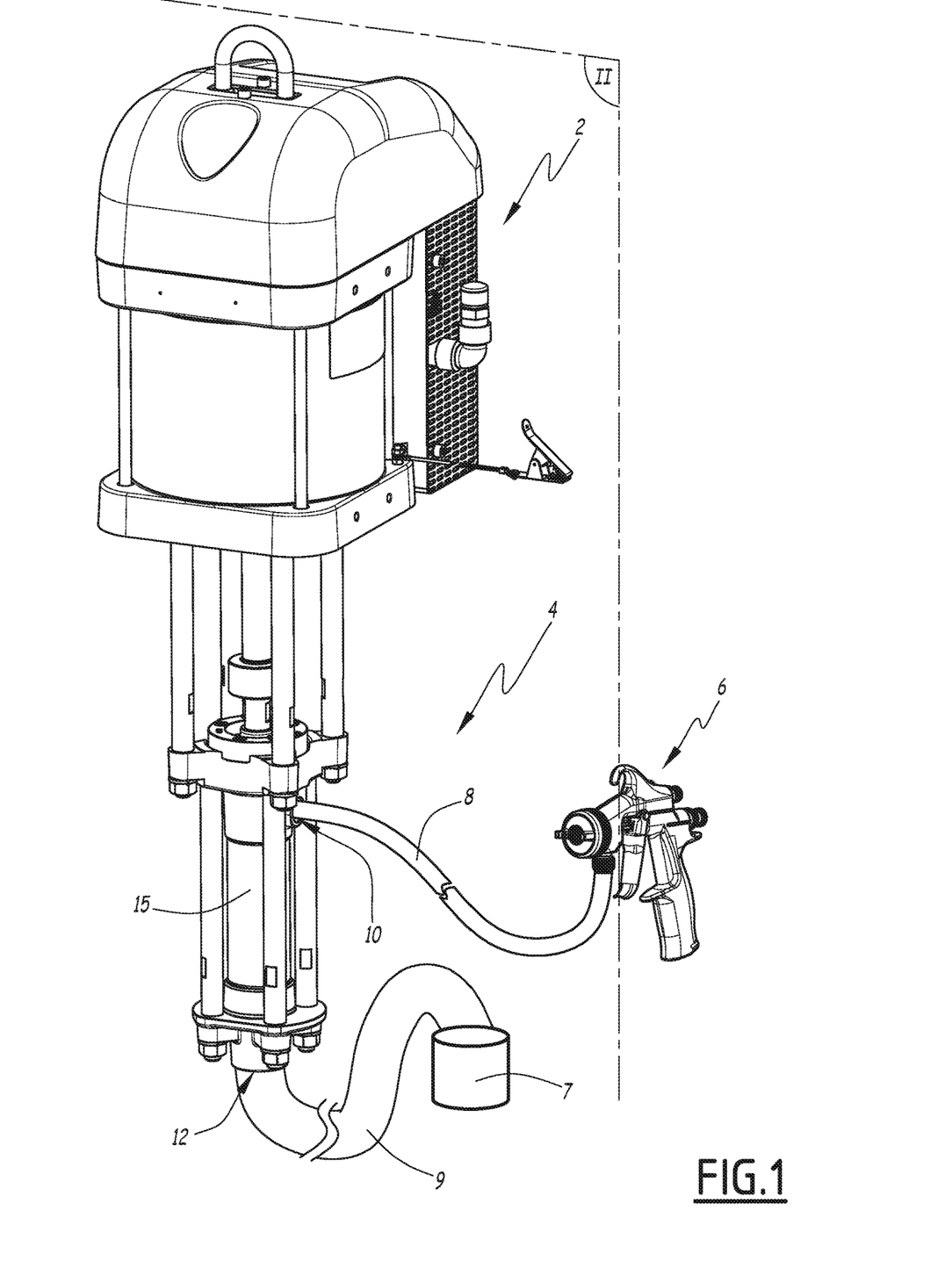
FIG. 1 is a perspective view of an installation including a pump according to the invention, a sprayer and a pipe coupling the pump to the sprayer.

The installation 2 shown in FIG. 1 comprises a pump 4 for a liquid product, a sprayer 6 and a pipe 8 fluidly coupling pump 4 to sprayer 6 in order to transfer the liquid product from pump 4 to sprayer 6.

Sprayer 6, suitable for spraying a liquid product on a target surface, not shown in the figures, is for example a manual gun as in FIG. 1, or an automatic sprayer, known in itself. The sprayer is of the airless type, that is to say, capable of spraying the liquid product without adding spray air. In this sense, installation 2 is an installation of the airless type. To that end, the pressure of the liquid product supplied by pump 4 to sprayer 6 must be high, for example greater than 30 bars.

Pump 4 includes a body 15 in which a suction opening is formed, or an inlet opening 12 for suctioning the liquid product, as well as a discharge opening, or outlet 10 for injecting the liquid product toward sprayer 6 through pipe 8. Inlet opening 12 is, for example, equipped with a gate 20 visible in FIG. 2. Inlet opening 12 is fluidly coupled to a liquid product tank 7, through a pipe 9.

Figure 2:
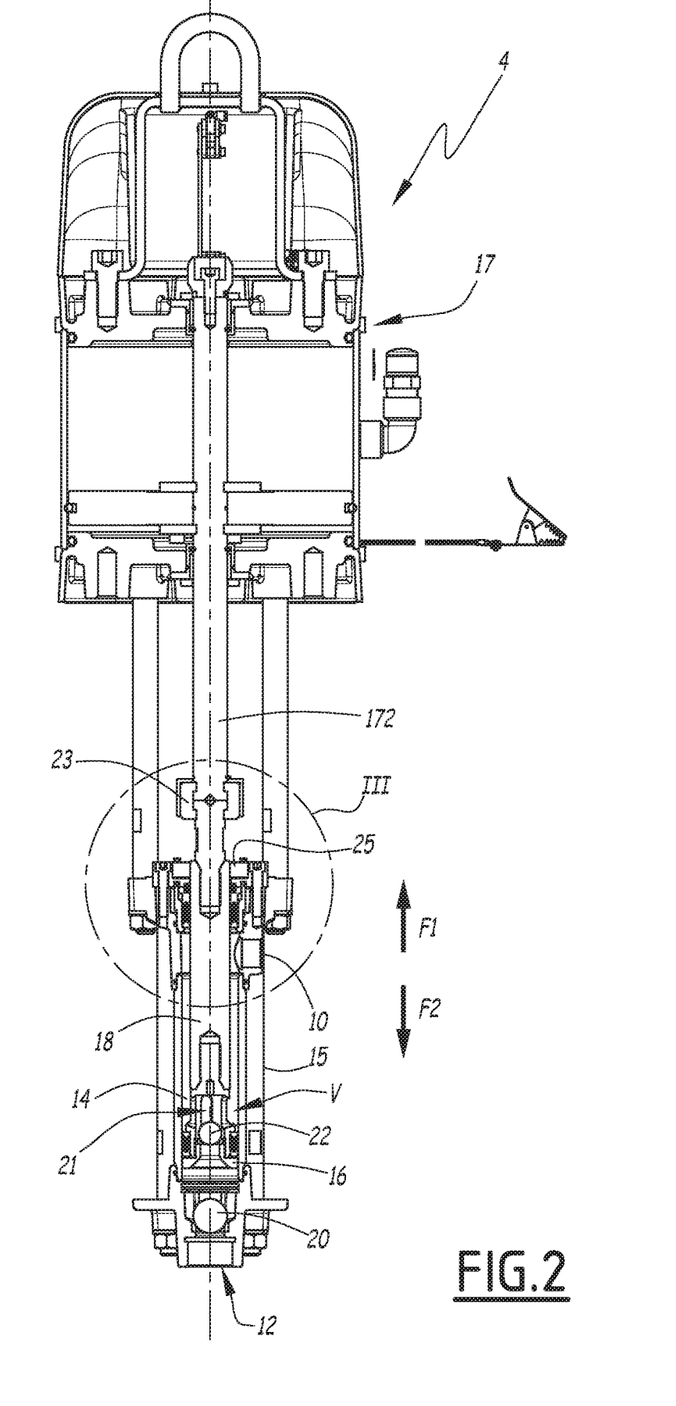
FIG. 2 is a schematic cross-section, in a plane II of FIG. 1, of the pump of the installation of FIG. 1.

Body 15 inwardly delimits a cylindrical compression chamber 14, in particular visible in FIG. 2, in which a piston 16 is mounted sliding along an axis X. Pump 4 includes an actuating motor 17 outside pump body 15 and coupled to piston 16 by a piston rod 18 passing through a wall 26 secured to pump body 15. In the mounted configuration of pump 4, axis X is combined with the longitudinal axis L18 of rod 18.

In practice, a coupler 19 screwed into rod 18 is coupled to an extension rod 172 of motor 17 using a flanged assembly 23, known in itself. Rods 172 and 18 are secured in translation parallel to axis X.

Motor 17 is, for example, an electric, pneumatic or internal combustion motor.

Pump 4 operates cyclically. A cycle is made up of a suction phase associated with a discharge phase. The alternation between the two phases is dictated by the translational movement of rod 18 and piston 16 in chamber 14. Under the action of motor 17, rod 18 and piston 16 move in an alternating translational movement, along axis X, relative to wall 26, which is stationary. Rod 18 is thus movable in a first direction embodied by arrow F1 in FIG. 2 and in the opposite direction, embodied by arrow F2 in FIG. 2. Chamber 14 and piston 16 delimit, inside pump 4 and as a function of the movement of rod 18, a variable volume V in which the liquid product is suctioned during the suction phase through inlet opening 12, the liquid product next being discharged through outlet opening 10, toward pipe 6 during the discharge phase.

Figure 3:
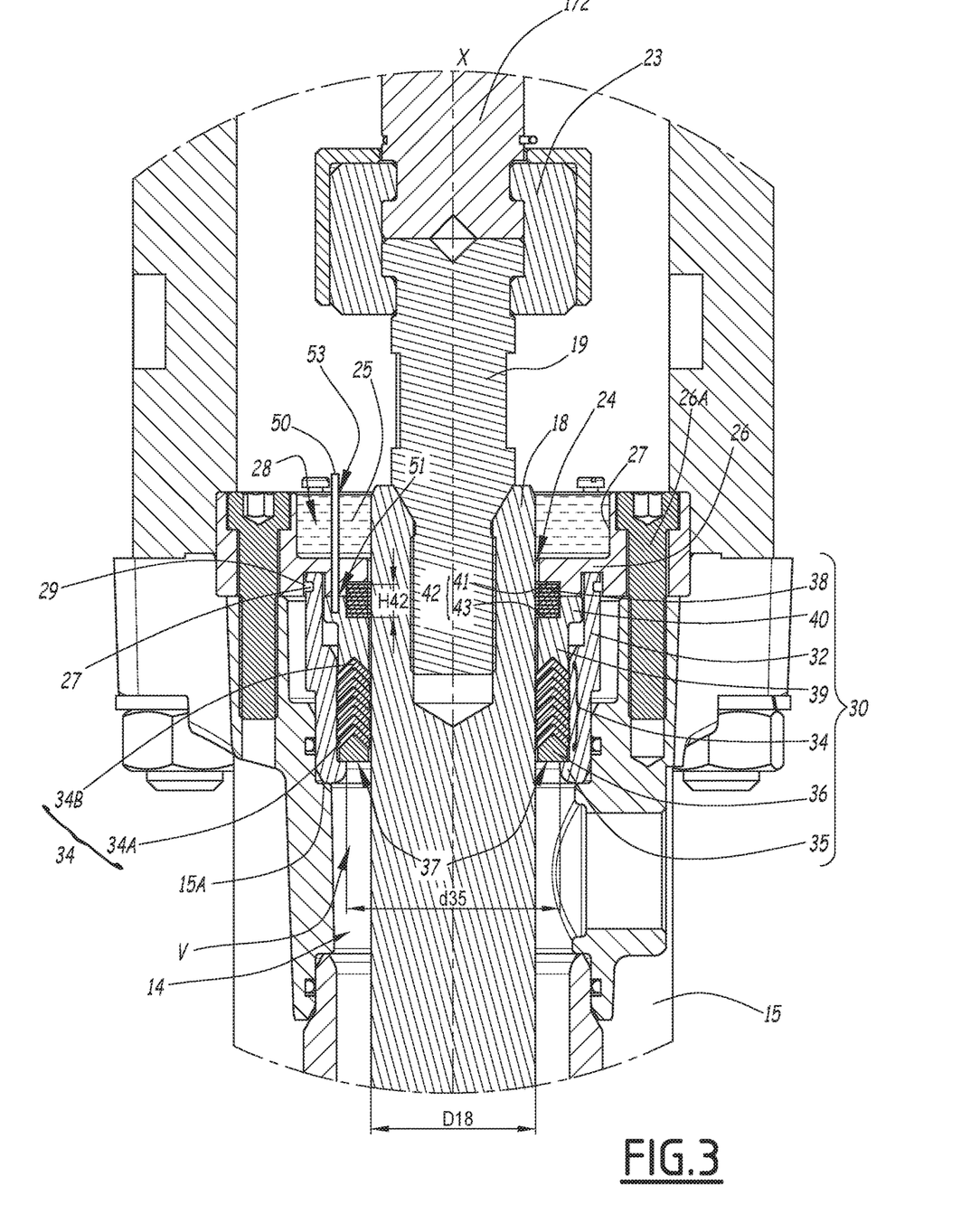
FIG. 3 is an enlarged view of detail III in FIG. 2, in a first configuration of the pump.

As shown in FIG. 3, wall 26 includes a passage opening 24 for passage of rod 18. Wall 26 outwardly, that is to say, opposite compression chamber 14, has an axial bore 28 around rod 18, arranged coaxial to axis X. Bore 28 is closed off by an annular cover 25A, also positioned around rod 18, in order to form a retaining space in the form of an annular cup 25 for a lubricant. Cup 25 and wall 26 are retained on body 15 by screws 26A. A lubricant may be arranged in the retaining volume formed by cup 25, while being protected by cover 25A, which makes it possible to continuously "wet" the outer radial surface of rod 18.

Passage opening 24 is equipped with a sealing device 30 that is received in a recess of body 15 and is axially kept bearing between body 15 and wall 26.

Sealing device 30 includes a cartridge of revolution 32, arranged coaxially to axis X, around rod 18. Cartridge 32 is a rigid piece in the form of an annular sleeve, with a cylindrical section centered on axis X.

An annular cavity 29 coaxial to axis X is arranged on inner surface 26B of wall 26; that is to say, the surface of wall 26 facing toward the compression chamber. One end of cartridge 32 bears on the bottom of cavity 29.

The first end of cartridge 32 engaged in cavity 29 includes at least one relief 27 for the engagement of the tool, facilitating the disassembly of cartridge 32 and sealing device 30 assembly. As shown in the figures, relief 27 is preferably an annular groove. In a variant, relief 27 may have a geometry different from an annular groove, for example, several separate notches, arranged in cartridge 32 and evenly distributed around axis X.

At its second end, opposite the first end, cartridge 32 bears on a shoulder 15A of body 15.

Cartridge 32 thus being axially stopped, along axis X, between body 15 and wall 26.

Figure 4:
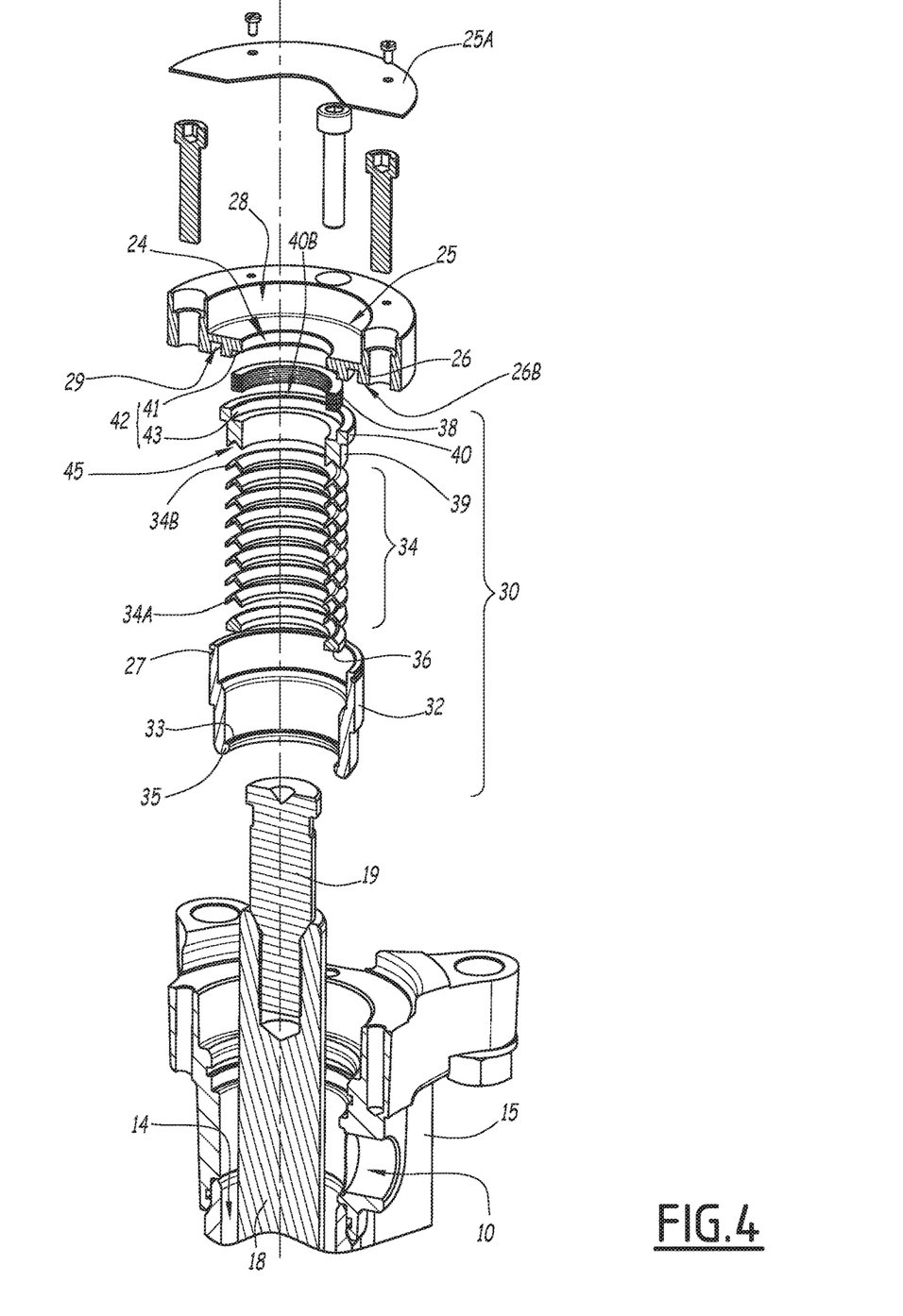
FIG. 4 is an exploded view of the self-tightening sealing device of the pump of FIGS. 2 and 3 and its environment.

Cartridge 32 inwardly delimits a volume accommodating a stack of seals 34. Stack 34 is coaxial to axis X and positioned around rod 18. Stack 34 includes at least two seals in the form of chevrons or Vs and preferably between six and ten seals superimposed along axis X, as shown in FIG. 4.

Cartridge 32 surrounds a ring 36 and a crown 39, ring 36 and crown 39 both being coaxial to axis X and positioned around rod 18. Thus, ring 36 and crown 39 are positioned in the inner volume of cartridge 32. Ring 36 cooperates by shape matching with a first seal 34A located at the end of stack 34 of V-seals, on the side of piston 16. Ring 36 bears on an inner shoulder 33 of cartridge 32 that is formed by an inner radial collar 35 of cartridge 32, which extends radially toward rod 18 and at a distance therefrom. Collar 35 and rod 18 delimit between them, radially with respect to axis X, an annular contact zone 37 between ring 36 and the liquid product present inside chamber 14.

The ratio between outer diameter D18 of rod 18 and inner diameter d35 of flange 35 of cartridge 32 is between 1.05 and 1.5, preferably between 1.2 and 1.4, still more preferably in the order of 1.3. Furthermore, the difference between diameters d35 and D18 is between 0.05 and 10 mm.

Sealing device 30 further includes an axial compression member 38 positioned coaxially to axis X around rod 18 and interposed between one end of crown 39, located opposite stack 34 of seals, and wall 26.

Here, the axial compression member is formed by a flat compression spring.

On its side opposite stack 34, crown 39 defines a bore 43 that receives one part of compression member 38, while another part of compression member 38 is received in a bore 41 arranged in inner surface 26B of wall 26 facing compression chamber 14. Bores 41 and 43 face one another, parallel to axis X, and together constitute a receiving housing 42, suitable for accommodating compression member 38.

Crown 39 also includes, on its side opposite bore 43, that is to say, on its side facing toward stack 34, a groove 45 suitable for cooperating by shape matching with a seal 34B located at the end of stack 34 of V-seals opposite ring 36.

Crown 39 includes, radially outside bore 41, an outer flange 40 delimiting, with wall 26, a movement travel of crown 39 under the action of spring 38. Crown 39 is mounted translatably, along axis X and relative to wall 26, between a first position, visible in FIG. 3, and a second position, visible in FIG. 5, and vice versa.

In the configuration visible in FIG. 3, a planar surface 40B of collar 40, perpendicular to axis X, is pressed against inner surface 26B of wall 26. Housing 42 then has a minimum volume, equal to the sum of the volumes of the parts of bores 41 and 43 located around rod 18.

Figure 5:
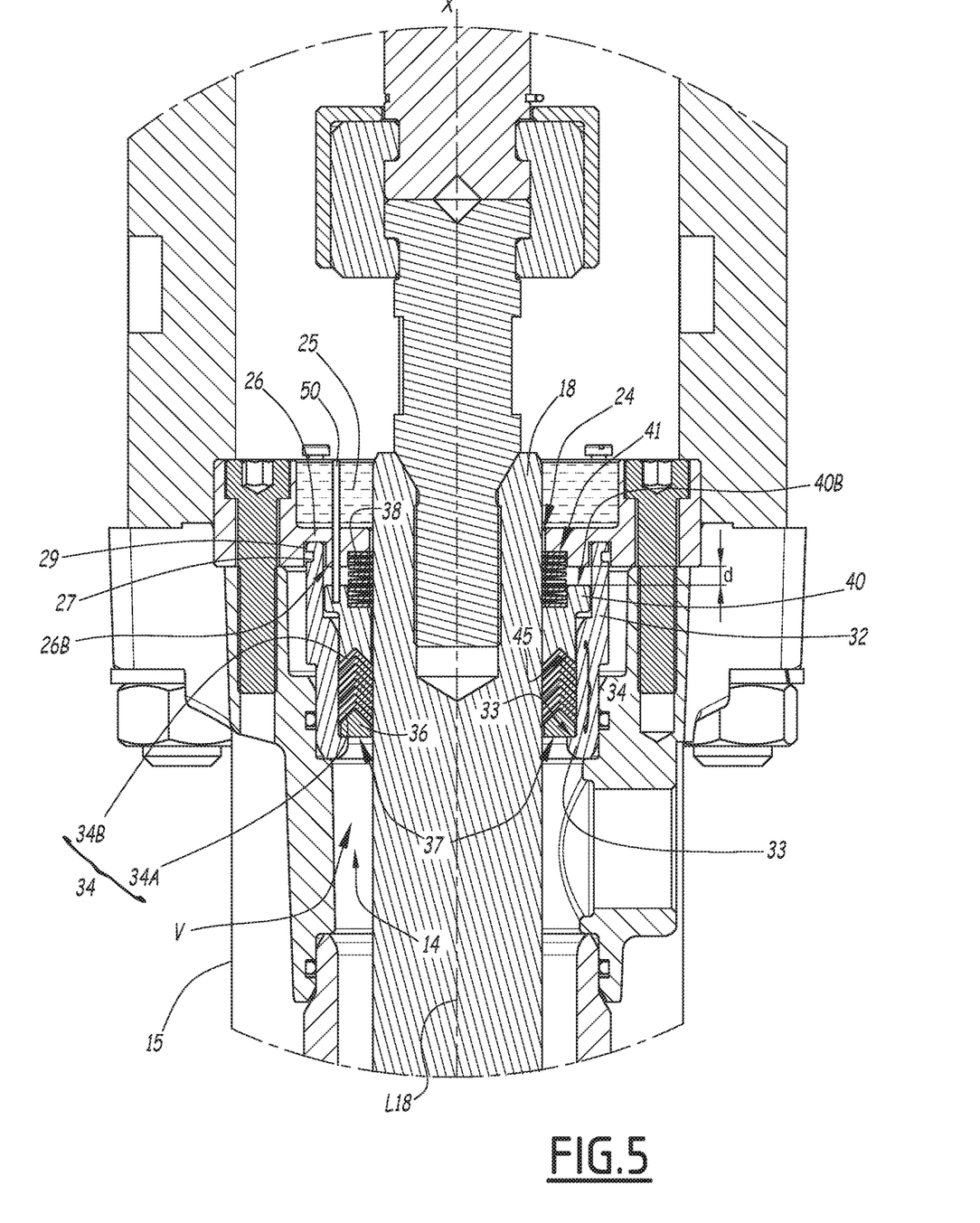
FIG. 5 is an enlarged view of circled detail III in FIG. 2, in a second configuration of the pump.

In the configuration visible in FIG. 5, planar surface 40B extends at a non-nil axial distance d from surface 26B and housing 42 has an increased volume, strictly greater than the minimum volume, this increased volume including not only the sum of the volumes of the parts of bores 41 and 43 located around rod 18, but also an annular volume of equal radial width and height d.

As shown in FIGS. 3 and 5, flange 40 of crown 39 is equipped with a wear indicator 50 of the V-seals of stack 34. Wear indicator 50 is preferably a graduated pin that passes through wall 26, through an orifice 51, and cover 25A, through an orifice 53. Indicator 50 protrudes from cover 25A, so as to be visible from the outside of pump 4.

Pump 4 is equipped with at least two nonreturn gates 20 and 22 made up of balls bearing on seats formed by pump body 15. The opening and closing of nonreturn gates 20 and 22 during the operating cycle of pump 4 regulate the circulation direction of the liquid product from inlet opening 12 toward outlet opening 10. When piston 16 and rod 18 move in direction F1, nonreturn gate 20 is open, while nonreturn gate 22 is closed, the liquid product is suctioned in chamber 14 through inlet opening 12 not obstructed by nonreturn gate 20. The liquid product is then located in the variable volume V between nonreturn gates 20 and 22. When piston 16 and rod 18 move in direction F2, nonreturn gate 20 is closed, which prevents the liquid product, previously suctioned, from flowing through inlet opening 12, while nonreturn gate 22 is open, thus allowing the liquid product to pass through a circulation opening 21, which was closed by nonreturn gate 22 during the movement of piston 16 in the direction F1. During the next movement of piston 16 in the direction F1, the pressure of the liquid product in chamber 14 increases; the liquid product is then discharged through outlet opening 10 and toward pipe 6.

As long as the liquid product is inside pump 4, this product is forced to move only along direction F1, since nonreturn gates 20 and 22 block the flow of the liquid product in direction F2, that is to say, the direction opposite direction F1, whether piston 16 and rod 18 move in the direction F1 or in the direction F2.

During the operating cycle of pump 4, ring 36 is subject to a force exerted on contact zone 37 by the liquid present in compression chamber 14, this force being exerted along axis X and oriented along direction F1. This force exerted on contact zone 37 is such that ring 36 tends to be translated along axis X in direction F1, the maximum movement being in the order of several mm, in practice less than 5 mm.

Stack 34 of V-seals is thus compressed by means of ring 36 under the effect of the force exerted on contact zone 37 by the pressurized liquid product. The ratio between outer diameter D18 of rod 18 and inner diameter d35 of flange 35 ensures that the area of contact zone 37 is relatively large, thus allowing a better distribution of the pressure on ring 36.

In the configuration of FIG. 5, compression member 38 works so as to move, along axis X, in direction F2, translatable crown 39, with the aim of compressing stack 34 of V-seals in this same direction.

Thus, for a pressure in chamber 14 of between 0 and 2 bars, the return force exerted by compression member 38 on seal 34B, by means of crown 39, compresses stack 34 of V-seals in direction F2, that is to say, in the opposite direction from the pressure force exerted by the liquid product present in compression chamber 14, which is negligible compared with that exerted by the compression member. Compression member 38 then practically by itself ensures compression of stack 34 of V-seals, and therefore sealing of pump 4. One is then in the configuration of FIG. 5.

In the case where the pressure of the product in the chamber is greater than 2 bars, two separate forces in opposite directions are exerted on either side of stack 34, namely the return force exerted by compression member 38 and the pressure force compressing the V-seals with respect to one another, thus allowing sealing device 30 and specifically stack 34 of seals to tighten themselves and thus allowing the sealing of pump 4 until complete wear of the seals. For pressures greater than 2 bars, the return force exerted by compression member 38, in direction F2, and the force exerted by the liquid product on ring 36, in direction F1, are combined to compress stack 34 on either side. One is then in a configuration midway between those of FIGS. 3 and 5.

When the pressure of the product in chamber 14 exceeds the threshold of 2 bars, the return force exerted by member 38 on stack 34 of V-seals is too low to counter the force coming from the pressure of the product. In this case, crown 39 is translated along axis X, in direction F1, until abutting against wall 26. This configuration corresponds to that shown in FIG. 3.

The minimum volume of housing 42 in which compression member 38 is housed at a height H42, measured parallel to axis X, greater than the maximum compression height that compression member 38 can endure. This minimum volume thus prevents compression member 38 from being found in a configuration with joined turns, this being a configuration unfavorable for compression member 38 and able to cause it to break. Flange 40 and bore 41 thus protect compression member 38 from crushing, in the case where the pressure of the liquid product in chamber 14 exceeds a given threshold.

Once the intensity of the force exerted by the pressurized fluid decreases below 2 bars, compression member 38 begins to compress stack 34 of V-seals again.

The threshold value of 2 bars mentioned above is an example; it is a relative pressure and it depends on characteristics of spring 38. In practice, it is between 1 and 20 bars.

With wear, the V-seals of stack 34 tend to collapse; stack 34 then loses height. Since indicator 50 is integrated into flange 40, which is secured to crown 39 placed on stack 34, and since flange 40 is monobloc with crown 39, the indicator tends to sink into cup 25, through orifice 53 of cover 25A, thus informing the user as to the wear of the V-seals of stack 34, without needing to disassemble the pump. It is therefore possible to alert the user, in the case where the seals are too worn and must be changed, without having to disassemble the pump in order to perform periodic checks.

Alternatively, compression member 38 is a helical spring with a circular section, a stack of washers, in particular Belleville washers, or any other compression member able to perform its function as previously described.

Although the invention is particularly well suited to spraying installations of the airless type, it can be implemented in other types of installations, in particular spraying installations with a pneumatic sprayer where the spraying is assisted by a flow of air.

In a variant, all of the minimum volume of receiving housing 42 can be formed in crown 39. In other words, compression member 38 uses simple bearing on surface 26B and bore 41 is eliminated.

According to one advantageous aspect that is independent of the structure of sealing device 30, piston 16 and endpiece 19 are screwed to the two opposite lower 182 and upper 184 ends of rod 18 and constitute, with it, a piece of equipment E1 moving along axis X. This piece of equipment is shown alone, in exploded axial cross-section, in FIG. 6.

Figure 6:
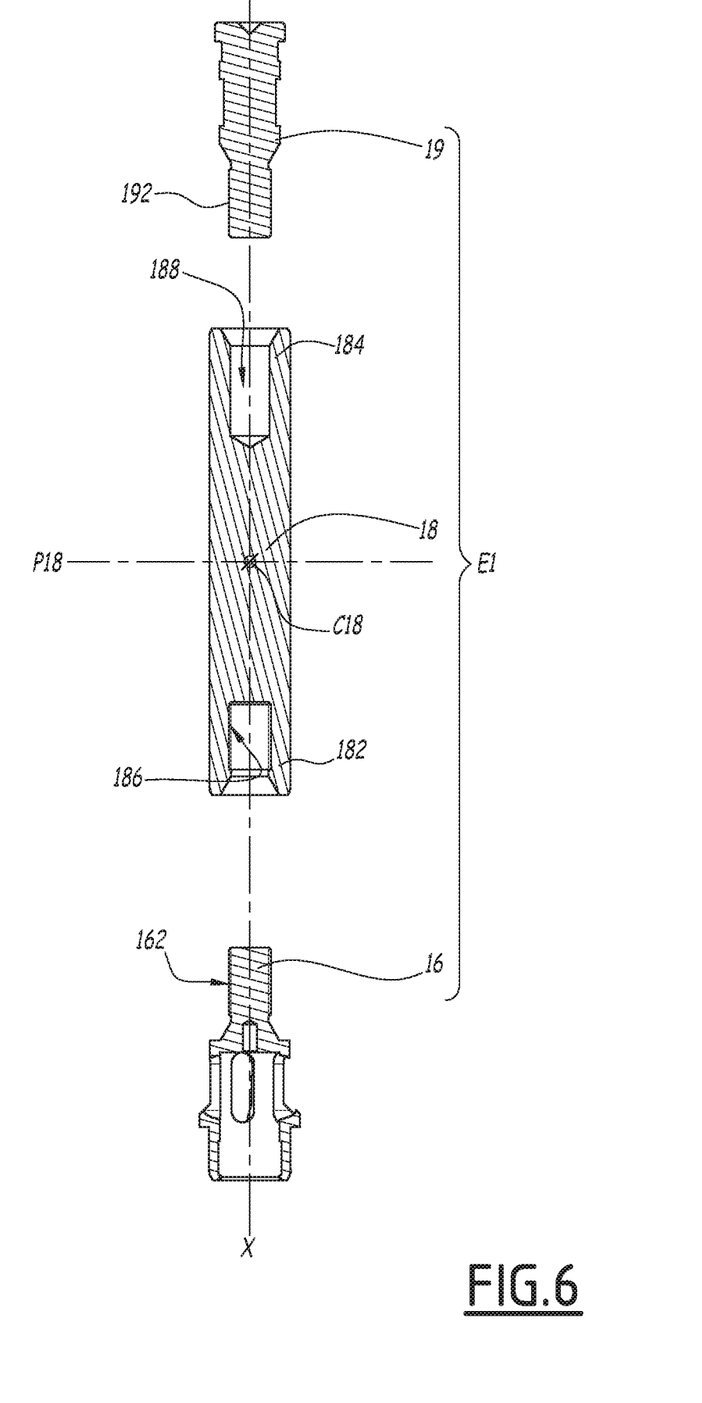
FIG. 6 is an exploded cross-section of a moving piece of equipment belonging to the pump of FIGS. 1 to 5.

To that end, end 182 is provided with a tapping 186 in which a threaded part 162 of piston 16 is screwed and upper end 184 is provided with a tapping 188 in which a threaded part 192 of endpiece 19 is screwed.

Thus, the piece of equipment E1 is formed by a reversible assembly of parts 16 and 19 on rod 18, which makes it possible to separate these parts if one of them is changed during a maintenance operation, in particular rod 18 due to friction at stack of seals 34. Thus, it is not necessary to change the entire piece of equipment E1 systematically.

The manufacture of the piece of equipment E1 in three separate subassemblies, namely piston 16, rod 18 and endpiece 19, is more economical than a monobloc manufacture. Furthermore, rod 18 is easier to machine than a monobloc piece of equipment E1, which broadens the panel of potential suppliers.

In light of the multipart structure of the piece of equipment E1, the materials used to manufacture parts 16, 18 and 19 may be different from one another and adapted to the function of each of these subassemblies. For example, rod 18 can be manufactured from hexavalent chromium, without parts 16 and 19 being made from this material, which is advantageous in terms of compliance with the procurement regulations for this metal in Europe.

Reference P18 denotes a plane passing through center C18 of rod 18 and perpendicular to axis X. Rod 18 is symmetrical relative to plane P18, which makes it possible to mount rod 18 in pump 4 in two head to tail positions, namely the position shown in the figures and an inverted position where end 182 is located at the top and end 184 is located at the bottom, piston 16 then being screwed on end 184 and endpiece 19 then being screwed on end 182.

According to a variant of the invention that is not shown, ends 182 and 184 of rod 18 may be threaded, while piston 16 and endpiece 19 are tapped in a corresponding manner. In this case, this involves a structural inversion relative to the embodiment shown in the figures.

The invention is not limited to coating product spraying. Pump 4 may be implemented to move other liquids, such as water, oil, ink or a single- or dual-component liquid glue.

The embodiment and alternatives mentioned above may be combined with one another to create new embodiments.

The invention claimed is:

1. A pump for a liquid product comprising:
a pump body inwardly delimiting a compression chamber, in which a piston is mounted sliding;
a sealing device comprising:
a stack of seals kept gripped axially against said pump body;
a crown comprising a wear indicator of seals of said stack of seals, passing through a wall secured to said pump body, and visible from outside of the pump; and
an axial compression member inserted between said crown and the wall; and
an external motor coupled to said piston for movement thereof by a piston rod passing through the wall, through a passage opening equipped with said sealing device.

2. The pump according to claim 1, wherein said crown delimits, in part, a receiving housing configured for accommodating said axial compression member.

3. The pump according to claim 2, wherein said crown is translatable relative to the wall between a first position, in which the receiving housing has a minimum volume, and a second position, in which the receiving housing has a volume greater than the minimum volume.

4. The pump according to claim 3, wherein the minimum volume of the receiving housing is delimited by a bore arranged in the wall and by a bore arranged in said crown, the respective bores facing one another.

5. The pump according to claim 1, wherein said sealing device comprises:
a cartridge, arranged coaxially to a movement axis of said piston and around said piston rod, the cartridge delimiting an inner volume accommodating said stack of seals; and
a ring,
said stack of seals and said ring being arranged coaxially to the movement axis around said piston rod, said ring being configured for cooperating by shape matching with the seal located at the end of said stack of seals, opposite said axial compression member.

6. The pump according to claim 5, wherein said piston and said compression chamber form a variable volume as a function of the movement of said piston rod, for accommodating and pressurizing the liquid product, a pressure of the liquid product in the variable volume exerting, on said ring, a force parallel to the movement axis of said piston in said compression chamber, said ring compressing said stack of seals under the effect of the force exerted by the liquid product in a first direction, and said axial compression member participating in the compression of said stack of seals by exerting a compression force, parallel to the movement axis of said piston, in a second direction, opposite the first direction.

7. The pump according to claim 5, wherein a cavity is arranged in a surface of the wall oriented toward an inside of said compression chamber, in that one end of the cartridge bears on a bottom of the cavity and in that the end of the cartridge includes at least one relief for the engagement of a tool.

8. The pump according to claim 1, wherein said axial compression member is a flat compression spring.

9. The pump according to claim 1, wherein said piston and said piston rod belong to equipment moving in an alternating movement along a movement axis of said piston, the equipment comprising three parts assembled together reversibly, namely, said piston, said piston rod and a securing endpiece, with an extension rod of said external motor.

10. The pump according to claim 9, wherein said piston rod comprises two tapped or threaded end parts in or around which said piston and said securing endpiece are screwed.

11. The pump according to claim 1, wherein said piston rod is symmetrical relative to a plane passing through its center and perpendicular to a movement axis of said piston, such that said piston rod can be mounted in two positions head to tail in the pump.

12. An installation for spraying a liquid product, comprising:
- a pump according to claim 1;
- a sprayer; and
- a pipe fluidly coupling said pump to said sprayer transferring the liquid product from said pump to said sprayer.

* * * * *